US008445767B2

(12) United States Patent
Brow et al.

(10) Patent No.: US 8,445,767 B2
(45) Date of Patent: May 21, 2013

(54) METHOD AND SYSTEM FOR INTERACTIVE MUSICAL GAME (76) Inventors: Thomas E. Brow, San Francisco, CA (US); Nico Benitez, Los Altos, CA (US)

(*) Notice: Subject to any disclaimer, the term of this patent is extended or adjusted under 35 U.S.C. 154(b) by 104 days.

(21) Appl. No.: 12/757,996

(22) Filed: Apr. 10, 2010

(65) Prior Publication Data

US 2010/0257993 A1    Oct. 14, 2010

Related U.S. Application Data (60) Provisional application No. 61/168,560, filed on Apr. 11, 2009.

(51) Int. Cl.
*A63H 5/00* (2006.01)
*G09B 15/08* (2006.01)

(52) U.S. Cl.
USPC ............... 84/609; 84/611; 84/644; 84/478; 84/485 R (58) Field of Classification Search
USPC ................................. 84/609; 6/609
See application file for complete search history.

(56) References Cited

U.S. PATENT DOCUMENTS

| 3,577,824 | A | * | 5/1971 | Lavan ........................... 84/478 |
| 3,724,097 | A | * | 4/1973 | Schmoyer ..................... 84/478 |
| 3,958,487 | A | | 5/1976 | Goldman |
| 5,214,231 | A | * | 5/1993 | Ernst et al. .................... 84/652 |
| 5,990,405 | A | | 7/1998 | Auten |
| 5,886,273 | A | * | 3/1999 | Haruyama ..................... 84/478 |
| 6,388,181 | B2 | * | 5/2002 | Moe ........................... 84/477 R |
| 6,407,324 | B1 | | 6/2002 | Hulcher |
| 6,821,203 | B2 | * | 11/2004 | Suga et al. ..................... 463/7 |
| 7,174,510 | B2 | * | 2/2007 | Salter ........................... 715/709 |
| 7,382,356 | B2 | * | 6/2008 | Parker et al. .................. 345/168 |
| 7,582,825 | B2 | * | 9/2009 | Chien et al. .................... 84/724 |
| 7,629,527 | B2 | * | 12/2009 | Hiner et al. ................. 84/470 R |
| 7,772,480 | B2 | * | 8/2010 | Brennan ....................... 84/615 |
| 2004/0055441 | A1 | * | 3/2004 | Katsuta ...................... 84/470 R |
| 2006/0252503 | A1 | | 11/2006 | Salter |

* cited by examiner

*Primary Examiner* — Christopher Uhlir
(74) *Attorney, Agent, or Firm* — Casimir Jones, S.C.

(57) ABSTRACT

An invention for an interactive musical game is presented that does not require the user to mentally map musical notation to instrument keys. More specifically, the invention comprises methods, apparatuses, and systems for entertainment using at least one electronic piano keyboard within a computer gaming system or module, wherein graphical game elements corresponding to note pitch, timing, duration, and/or rhythm align with and substantially correspond to the width of the keys.

17 Claims, 4 Drawing Sheets

METHOD AND SYSTEM FOR INTERACTIVE MUSICAL GAME

This application claims priority to U.S. Provisional Application No. 61/168,560 filed Apr. 11, 2009, which is incorporated herein by reference in its entirety.

FIELD OF INVENTION

The present invention relates generally to interactive musical games. More specifically, the invention relates to methods, apparatuses, and systems for entertainment using at least one electronic piano keyboard within a computer gaming system or module wherein graphical game elements corresponding to note pitch, timing, duration, and/or rhythm align with and substantially correspond to the width of physical piano keys.

BACKGROUND

In 1995, Harmonix Music Systems was founded as a video game development company with the mission to "give music-loving non-musicians—the millions of passionate air-guitarists in the world—[a chance] to play music" (Stone, D, Game-Critics.com, published Mar. 31, 2004). Harmonix is responsible for Rock Band® and the original Guitar Hero® games, two titles in a profitable and popular genre of video games that allows even musical novices to create music as they play. The success of those games, says co-founder Alex Rigopulos, owes to the fact that playing music is "one of the most fundamentally joyful experiences that life has to offer."

As Rigopulos's phrasing suggests, games like Guitar Hero do not aim to train the player as a bona fide musician, but only to simulate the experience of music-making for the player's satisfaction. The painstaking practice required to learn to play music "the old-fashioned way" are frustrating and prohibitive, he argues. However, dedicated players of Guitar Hero may devote as much time and effort to practicing their USB instruments as traditional musicians do to practicing their real ones. Some players are able to "play" entire songs from memory, without the visual cues of the game, and even without hearing the accompanying parts. Unfortunately, even if these skills are as impressive and as difficult to attain as real musical talent, they can never be applied to a real instrument. Mastery of a five-button guitar simply does not translate to six strings.

Considering the piano as one example, becoming instrumentally proficient usually requires significant resources. Barriers to achieving proficiency include time, the cost of owning or accessing the instrument, possible cognitive and/or developmental barriers of would-be players, and the availability and expense of skilled teachers. A significant challenge for any novice instrumentalist is the need to mentally map traditional musical notation to the keys of the instrument. In the case of a standard-format piano, this imposes a major hurdle: for every musical notation element presented to the novice player, she or he must determine which of the 88 keys to depress, when to depress them, and for how long.

A number of solutions have been developed in an attempt to ease this burden on the novice player. For example, Casio Europe GmbH manufactures and sells electronic keyboards with lighted keyboard guidance systems in which keys illuminate to indicate which of the keys the player should depress. However, in this system, the user receives little forewarning of necessary key depression, rendering the player to a "reactive" state rather than allowing him or her to adjust hand position and/or fingering to accommodate upcoming note sequences.

U.S. Pat. No. 3,958,487, herein incorporated by reference in its entirety, presents a system for external illumination of keys by a series of light-emitting elements, while U.S. Pat. No. 6,407,324, herein incorporated by reference in its entirety, presents a system in which a frame bearing key-illuminating LEDs is mounted over a piano keyboard. Each of these systems share the problem of the Casio system of being "reactive" to the light cue. In addition, these systems can be cumbersome to implement and difficult to retro-fit to existing keyboards.

Popular music video games such as the aforementioned Guitar Hero® and Rock Band® games allow simulated instrumental play, and provide advance visual cues for which notes should be played and when the notes should be played, but these systems have not been capable of incorporating piano keyboards into the gaming system due to the complexities involved, e.g., in accommodating of a number of keys typically found on a piano, or even a sufficiently large subset of the keys to provide satisfying game play. By way of contrast, typical guitar-mimicking game controllers require five or fewer input buttons.

There are instructional systems geared for use with full size keyboards, such as Synthesia and Piano Wizard® (U.S. Pat. No. 7,174,510 and U.S. patent application Ser. No. 11/411,835; each herein incorporated by reference in its entirety). The instructional systems use a computer to provide visual cues for the notes that are to be played on a keyboard, and they do not require the user to read traditional musical notation. However, as these systems do not provide alignment of the visual cues to the physical keyboard on which the player plays, they still require mental mapping of these graphical elements to instrumental keys. Several of these systems also require the use of a proprietary keyboard or other input devices.

Music games like the Guitar Hero® game represent an improvement over those songbooks in that they frame the task as a game, and are able to give the player visual feedback on her performance and reward good playing. This approach appeals particularly to children and other users who are accustomed to a video gaming mindset, which entails points, goals, and achievements. In the Guitar Hero game, visual cues on the game display indicate which note or notes (buttons on the input device) are to be "played". The visual cues appear at a starting position on the display and advance toward a predetermined second position on the display, and the notes are played when the cues reach the second position. In this fashion, the player has advanced warning of which notes to play, the level of difficulty of the game can be easily and incrementally increased by presenting more and/or faster visual cues. However, in order for these games to be intuitive and enjoyable, they sacrifice the mapping between the game instrument and the real instrument it represents. For example, a player who masters the guitar-shaped game controller used in the Guitar Hero game will not, based only on skills acquired from the game, be able to play a real electric guitar.

The Synthesia training described system above uses a system of advance visual cues similar to the Guitar Hero game, and also incorporates a standard piano keyboard. In the Synthesia system, a sequence of dots and dashes scrolls downward over and in alignment with an image of a keyboard on a computer screen, to indicate which keys the user must press (and for how long) on a piano keyboard attached to the same computer. The player is scored on the accuracy and timing of her key presses. While this scrolling note approach is the similar to that used in Guitar Hero, the onscreen keyboard is not scaled to a real keyboard. In the Synthesia system implementation, the user must visually trace each of the advancing notes down one of the many keys of the onscreen keyboard. Because the image of the keyboard onscreen is not the same size as a real keyboard (i.e., it is generally much smaller, so as to fit on the screen) and because there is no actual physical or visual alignment between the onscreen keyboard and the keyboard device played by the player, the user must then locate the correct key on the physical keyboard without any visual reference point that is apparent to a musical novice. This hunt-and-peck process proves too time-consuming to allow novices to play at a normal pace.

The present invention comprises a novel musical game, focused on the piano keyboard, with the unique benefit of preparing users to play music on real piano or other similar keyboard instrument. The game is designed to be compelling to musicians and novices alike, and can be implemented with standard keyboard and display hardware.

SUMMARY OF THE INVENTION

The present invention relates to methods, apparatuses, and systems for an interactive musical game. More specifically, the invention relates to methods, apparatuses, and systems for entertainment using at least one piano keyboard within a computer gaming system or module wherein graphical game elements corresponding to note pitch, timing, duration and/or rhythm align with and substantially correspond to the width of physical piano keys.

In some embodiments, a computing unit bearing audio files such as MIDI files (or to which audio files or MIDI files have been downloaded) is in communication with an electronic keyboard. In some embodiments, a keyboard-proximal display is juxtaposed with physical piano instrument keys. In some embodiments, game elements corresponding to note elements directed by the audio or MIDI files are presented to the player on the keyboard-proximal display. In some embodiments, the game elements are projected onto the keyboard-proximal display, which is a passive surface for interception of the graphical component of game play. In some embodiments, the projection means is in communication with the computing unit. In some embodiments, the keyboard-proximal display is an active display surface in communication with the computing unit. In some embodiments, a calibration process ensures that the width and position of game element fields correlates to the width and position of physical piano keys. In some embodiments, the piano keyboard is an electronic keyboard. In some embodiments, the electronic piano bears a USB (Universal Serial Bus) port.

In some embodiments, game elements are generated that have direct correlation to pitch, timing, duration, and rhythm dictated by note elements of the audio or MIDI file. In some embodiments, game element graphics incorporate a feature or features correlated with note element volume. In some embodiments, game elements travel downward on the keyboard-proximal display to ultimately intersect with the upper planar surface of physical piano keys. In some embodiments, a game element window is employed such that the player is presented with incoming game elements prior to the corresponding audio presentation, enabling the user to anticipate hand position and/or fingering that will facilitate execution of future notes. In some embodiments, additional graphical features that enhance game play may be presented to the user. In some embodiments, more than one user may participate in game play. In some embodiments, more than one piano keyboard may be involved in game play. In some embodiments, keyboard and non-keyboard instruments may be involved in game play during the same game session. In some embodiments, the intersection of a game element or elements with a defined position correlates with the presentation of audio display to the user. In some embodiments, the defined position for audio display presentation is the intersection of the game element with the top planar surface of the physical piano keyboard keys. In some embodiments, the defined position for audio display presentation is the intersection of the game element with some other point, such as an established graphical baseline.

In some embodiments, a play accuracy detection process occurs during which data are collected regarding user key strike position, timing, moment of depression, duration of depression, moment of release, and/or key strike intensity. In some embodiments, a reward is presented to the user when play accuracy detection process determines that the user has achieved a defined level of accuracy. In some embodiments, the reward is a graphical presentation. In some embodiments, the reward is an audio presentation.

In some embodiments, modules involved in information flow occurring during the course of the method of the present invention include a file system (operating system) module, a MIDI (MIDI/USB) module, a keyboard input handler module, a song file parser module, a game logic module, a network game module, a TCP module, an audio feedback module, an onscreen interface module, and a display calibration module.

The present invention provides systems for implementation of methods to promote an interactive musical game wherein the user is not required to mentally map musical notation to physical keys of a piano. In some embodiments of the system, a computing unit bearing audio files such as MIDI files (or to which audio files or MIDI files have been downloaded) is in communication with an electronic keyboard. In some embodiments of the system, a keyboard-proximal display is juxtaposed with physical piano instrument keys. In some embodiments of the system, game elements corresponding to note elements directed by the audio or MIDI files are presented to the player on the keyboard-proximal display. In some embodiments of the system, the game elements are projected onto the keyboard-proximal display, which is a passive surface for interception of the graphical component of game play. In some embodiments of the system, the projection unit is in communication with the computing unit. In some embodiments of the system, the keyboard-proximal display is an active display surface in communication with the computing unit. In some embodiments of the system, a calibration process ensures that the width and position of game element fields correlates to the width and position of physical piano keys. In some embodiments of the system, the piano keyboard is an electronic keyboard. In some embodiments of the system, the electronic piano bears a USB (Universal Serial Bus) port. In some embodiments of the system, modules involved in information flow include a file system (operating system) module, a MIDI (MIDI/USB) module, a keyboard input handler module, a song file parser module, a game logic module, a network game module, a TCP module, an audio feedback module, an onscreen interface module, and a display calibration module.

DEFINITIONS

As used herein, "note element" is a unit of sound whose pitch, and/or duration is directed by an audio file such as a MIDI file. In some embodiments, a note element is generated by a user in response to a music-making cue. In some embodiments, a note element is generated by a computing unit.

As used herein, "game element" is a graphically presented, visual element that is correlated to at least one note element. A game element may, for example, be correlated to one or more aspects of a note element, including but not limited to pitch and duration, of a note element. In preferred embodiments, a game element correlates to both pitch and duration of a note element. A game element may, in some embodiments, include correlation to a volume of a note element. A pattern or frequency of a plurality of game elements may correlate to a rhythm of a plurality of note elements. During play, game elements may be presented simultaneously or sequentially. A game element may be presented prior to, simultaneously with, or after an audio presentation of a corresponding note. In preferred embodiments, game elements are music making cues, providing advance notice to a player of an operation, e.g., the position of a key to be operated, the time at which a key should be operated, the length of time that a key should be operated, etc.

As used herein, "game element field" is the maximum physical width that a game element may occupy on a graphical display.

As used herein, "game element window" refers to an adjustable unit of presentation time relating to a game element.

As used herein, the term "incoming game element" refers to a game element that has appeared on the graphical display and that is moving toward the point or position on the display that signals the first audio presentation of the corresponding note (e.g., the first time at which the player should operate a corresponding key and/or the first point it time at which the computing unit will play the note).

As used herein, an "incoming game element window" refers to the duration of time between the first appearance of a game element and the time at which the game element reaches a position on the display surface that signals the first audio presentation of the corresponding note.

As used herein, "keyboard-proximal display surface" is defined as an essentially planar surface for visual presentation of a game element or elements, e.g., a screen, wall, board, etc. In some embodiments, the keyboard proximal display is passive, e.g., it is a surface that does not generate an image, but on which an image may be projected or otherwise displayed, while in other embodiments, the keyboard proximal surface is active, e.g., it generates an image (it comprises, e.g., a CRT, LCD, or other electronic display). Other graphics inherent to or enhancing game play may also be visually presented on a keyboard-proximal display surface. Examples of additional elements include but are not limited to light show type graphics or other graphics. Additional elements may be presented in coordination with the music, e.g., appear, pulsing, flashing, or changing color and/or shape with the beat of the music, or they may be static, or presented in a fashion that is not substantially coordinated with the music. It is contemplated that, if a keyboard is configured to have the keys in a non-linear configuration (e.g., in a curve), a keyboard proximal display surface may also be non-planar, so as to be follow the shape described by the array of keys.

As used herein, "player key operation" refers to the position/pitch, timing, and duration of keyboard contacting or depression by the player. Player key operation may include the intensity of key strike.

As used herein, "play accuracy detection" refers to the determination of player key operation with regard to position (pitch), timing, and/or duration of key depressions in relation to pitch, rhythm and duration of audio notes and/or game elements. Play accuracy detection may also include evaluation of key strike strength in relation to audio note volume.

As used herein, "reward" refers to a graphical, audio, numerical, or other player notification event that occurs in relation to play accuracy detection. A reward may be a positive indicator of accurate game play (e.g., bells, accrual of points, indication of advancing level, etc.) or it may be a negative indictor of inaccurate game play (e.g., a buzzer other unpleasant noise).

As used herein, "audio display" or "audio presentation" refers to audio sounds presented to and perceptible by the keyboard player and/or other game participants. Audio display may be directly correlated to a note element or elements. An "audio display unit" is a device capable of presenting an audio display to the user (e.g., a sound system).

As used herein, the term "MIDI" stands for musical instrument digital interface. "MIDI file" refers to any file that contains at least one audio track that conforms to a MIDI format. The term MIDI is known in the art as an industry-standard protocol defined in 1982 that enables electronic musical instruments such as keyboard controllers, computers, and other electronic equipment to communicate, control, and synchronize with each other. MIDI allows computers, synthesizers, MIDI controllers, sound cards, samplers and drum machines to control one another, and to exchange system data (acting as a raw data encapsulation method for sysex commands). MIDI does not transmit an audio signal or media—it transmits "event messages" such as the pitch and intensity of musical notes to play, control signals for parameters such as volume, vibrato and panning, cues, and clock signals to set the tempo. As an electronic protocol, it is notable for its widespread adoption throughout the industry. Versions of MIDI include but are not limited to MIDI 1.0, General MIDI (GM), General MIDI level 2 (GM2), GS, XG, and Scalable Polyphony MIDI (SP-MIDI). MIDI file formats include but are not limited to SMF format, .KAR format, XMF file formats, RIFF-RMID file format, extended RMID file format, and .XMI file format.

As used herein, the term "pitch" refers to any playable instrument sound that can be mapped to a MIDI instrument key or program number. For some instruments, e.g., piano, standard MIDI assignments describe a range of ascending musical pitches associated with the fundamental frequencies of the sounds. For other sounds such as amelodic instruments, e.g., drums, or sound effects (e.g., gunshot, bird tweet), pitch refers to the particular selected sound associated with the MIDI assignment. In some embodiments, pitch is a property of a note element. In some embodiments, pitch is a property of an audio presentation. In some embodiments, pitch may be specified by a game element.

As used herein, the term "rhythm" means the temporal property of a sound. One skilled in the art will appreciate that the duration for which a sound is sustained and the timing of the sound with respect to other sound events are inherent properties of rhythm. In some embodiments, rhythm is a property of a note element. In some embodiments, rhythm is a property of an audio presentation. In some embodiments, rhythm may be specified by a game element. In yet other embodiments, rhythm is a property of one or more visual elements on the keyboard proximal display surface.

As used herein, the term "key" means any surface which a user contacts to generate music during gameplay. In some embodiments, a key may be played by depression, as with a USB electronic keyboard musical instrument. In some embodiments, a key may be played by contacting a surface, as with a touch-sensitive panel.

As used herein, the term "calibration step" means a process by which the dimension of at least one graphical game element is adjusted to substantially correspond with the dimension of at least one key. In some embodiments, the dimension that is adjusted during the calibration step is the width.

As used herein, the term "alignment" or "substantially aligned" means a correspondence between at least one dimension of at least one graphical element with at least one key. In some embodiments, the width of at least one graphical element is aligned with the width of at least one key.

As used herein, the term "music-making cue" means a presentation of information to a user with the goal of prompting the user to contact or depress a key in a manner correlating with a note element. In some embodiments, a graphical game element may constitute a music-making cue. In some embodiments, other types of informative presentations may constitute music-making cues, such as informative audio presentations. In preferred embodiments of the invention, a game element provide a music making cue, e.g., providing information about the key to be operated in order to play the correct note and further indicating when the key should be operated.

As used herein, the term "player key operation" means the act or process of a player contacting or depressing a key.

As used herein, the term "position" as used in reference to a key, means the physical location of a key of interest on a musical keyboard. In some embodiments, a game element may present positional information. In some embodiments, other types of informative presentations may present positional information, such as informative video and/or audio presentations.

As used herein, the term "timing" refers to the moment of initiation and/or cessation of a note element.

As used herein, the term "duration" means the length of time that a note element is sustained.

As used herein, the term "sequence" means the order in which note elements are presented, played, occur, or are generated. Sequence may also refer to the order in which music making cues signal that note elements are to be presented played, occur, or are generated.

As used herein, "music file" means any computer file encoding musical information. In some embodiments, a music file is a MIDI file.

As used herein, the term "key strike intensity" means the force with which a user contacts or depresses a key.

As used herein, the term "accuracy" or "play accuracy" means the success with which a user generates note elements in response to music-making cues. Such music-making cues may include but are not limited to graphical game elements. In some embodiments, play accuracy is determined by assessing the actual sequence, pitch, timing, and/or duration of note elements generated by a user in comparison to the sequence, pitch, timing, rhythm, and/or duration of note element information presented by music-making cues.

As used herein, the term "user" means any subject engaging in game play. In some embodiments, the subject is a human. The term "player" and "user" may be used interchangeably. In embodiments wherein instrumental proficiency is a goal, the term "student" may be used interchangeably with the terms "player" and/or "user".

As used herein, the term "computing unit" means any system that includes a processor and memory. In some embodiments, a computing unit may also contain a video display. In some embodiments, a computing unit is a self-contained system. In some embodiments, a computing unit is not self-contained.

As used herein, a "keyboard musical instrument" is any device including keys that is capable of use in the generation of music, e.g., through the generation of MIDI information. In some embodiments, a keyboard musical instrument is a USB keyboard. In some embodiments, a keyboard musical instrument includes keys or buttons that are depressed. In some embodiments, a keyboard musical instrument includes touch-sensitive keys that are contacted directly or indirectly by a user. A keyboard musical instrument is not limited by the number of keys, orientation or arrangement of keys, key surface, or manner in which a user interacts with the keys. In some embodiments, a keyboard musical instrument is an electronic device. In some embodiments, a keyboard musical instrument is not an electronic device. In preferred embodiments, a keyboard musical instrument is a piano keyboard musical instrument.

As used herein, the term "piano keyboard musical instrument" refers to a keyboard musical instrument comprising keys (e.g., depressable keys or touch-sensitive keys) that correspond in sequence and musical scale to a standard 88-key piano keyboard, or to a subset of the keys on a standard piano keyboard. In preferred embodiments of a piano keyboard musical instrument comprising fewer than all 88 keys, the keys are a subset of the 88 keys that are in the same position with respect to each other as they are on a standard 88-key keyboard. As used herein, the term "piano" includes musical instruments comprising keyboards laid out in a similar, essentially linear fashion, e.g., organ, keyboard synthesizer, harpsichord, accordion, etc.

As used herein, the term "display calibration" refers to a calibration process that allows correction of the display image to ensure that the position of game element fields correlates to the position of physical piano keys. In some embodiments, the calibration further matches the width of the game element fields to the width of the physical piano keys. A "display calibration module" refers to software or hardware provided to effect display calibration.

DETAILED DESCRIPTION OF THE INVENTION

The present invention relates to methods, apparatuses, and systems for an interactive musical game. More specifically, the invention relates to methods, apparatuses, and systems for entertainment using at least one piano keyboard within a computer gaming system or module wherein graphical game elements corresponding to note pitch, timing, duration and/or rhythm align with and substantially correspond to the width of physical piano keys.

Game embodiments of the present invention, named Synth Champion, allow players to both immediately gratify the fundamental desire to make music and simultaneously develop musical skills that can be applied outside the game. In other words, the player will be as skilled on a real instrument played outside the context of the game as they are on the instrument during game play. In one embodiment, Synth Champion comprises a piano music game in which the controller is a real piano keyboard, and in which the songs that the player learns can be played on any other piano or electronic keyboard without the use of the rest of the Synth Champion system.

This invention is of benefit to any of the "music-loving non-musicians" who are attracted to the music game genre in general. Even gamers who have no particular desire to learn to play piano would find the invention's game play intrinsically satisfying, similar to the player satisfaction of Guitar Hero and Rock Band games. For these users, the game is a novel experience, as no existing popular music game on the market focuses on the piano.

The audience segment that benefits most from the present invention, however, is the set of non-musicians who are interested in learning to play a real instrument. This segment includes both those who have never been exposed to musical instruction and those who have attempted to learn an instrument but were not able. People in the former group may not be able to afford to rent or purchase an instrument, or to pay for instruction. Typically, those combined costs are many times greater than that of a music game, including the cost of the specialized controller. Since the game is able to provide instruction comparable to real instrument lessons, this sort of instruction is made affordable and accessible to a wider and less privileged audience.

The former group also includes young children who have not yet begun formal musical training in school. For such children, game embodiments of the present invention could supplement (or replace) formal training with a mode of learning that is more fun and intuitive. Moreover, game embodiments of the present invention may be accessible to children who are too young to begin formal training due to reading level, cognitive development, or other factors. Likewise, game embodiments of the present invention may be helpful to adults with cognitive disabilities that prevent them from using the tools of traditional instruction, such as sheet music.

The latter group, namely non-musicians who have tried and failed to learn an instrument by traditional methods, also benefit from game embodiments of the present invention. A likely reason for discontinuing musical instruction is for want of short-term gratification, which challenging instruments like the piano do not guarantee. By contrast, music games typically offer adjustable difficulty, and can encourage the player by producing complex and pleasing melodies even as the user plays on the easiest setting. Thus the user can enjoy auditory gratification from her first game until the day she completes the game on the "expert" level.

Game System Set Up

Figure 1:
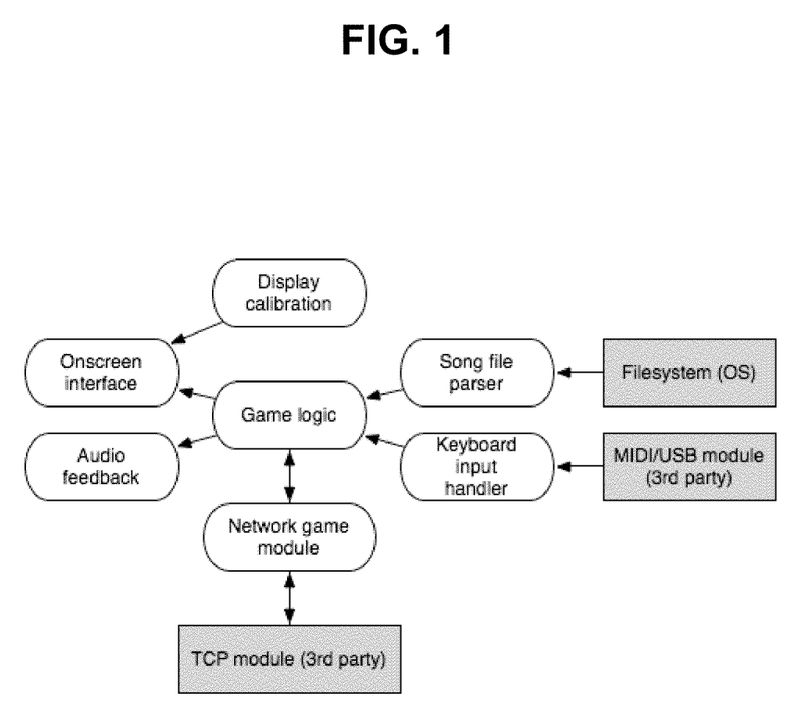
FIG. 1 shows a block diagram illustrating information flow between modules of an embodiment of the present invention.
Figure 2:
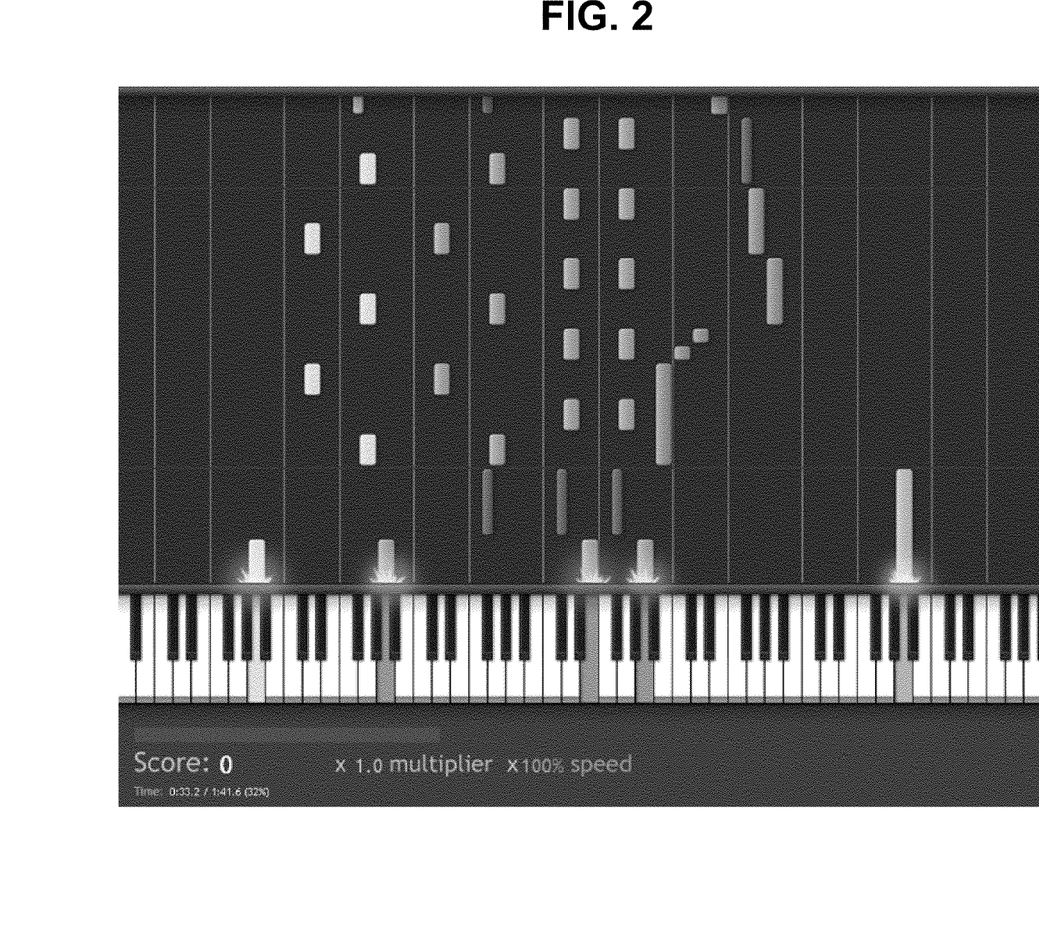
FIG. 2 shows a screenshot of a software game named Synthesia, in which a sequence of elements representing notes for a song is displayed as a series of markers scrolling over an onscreen virtual keyboard.
Figure 3:
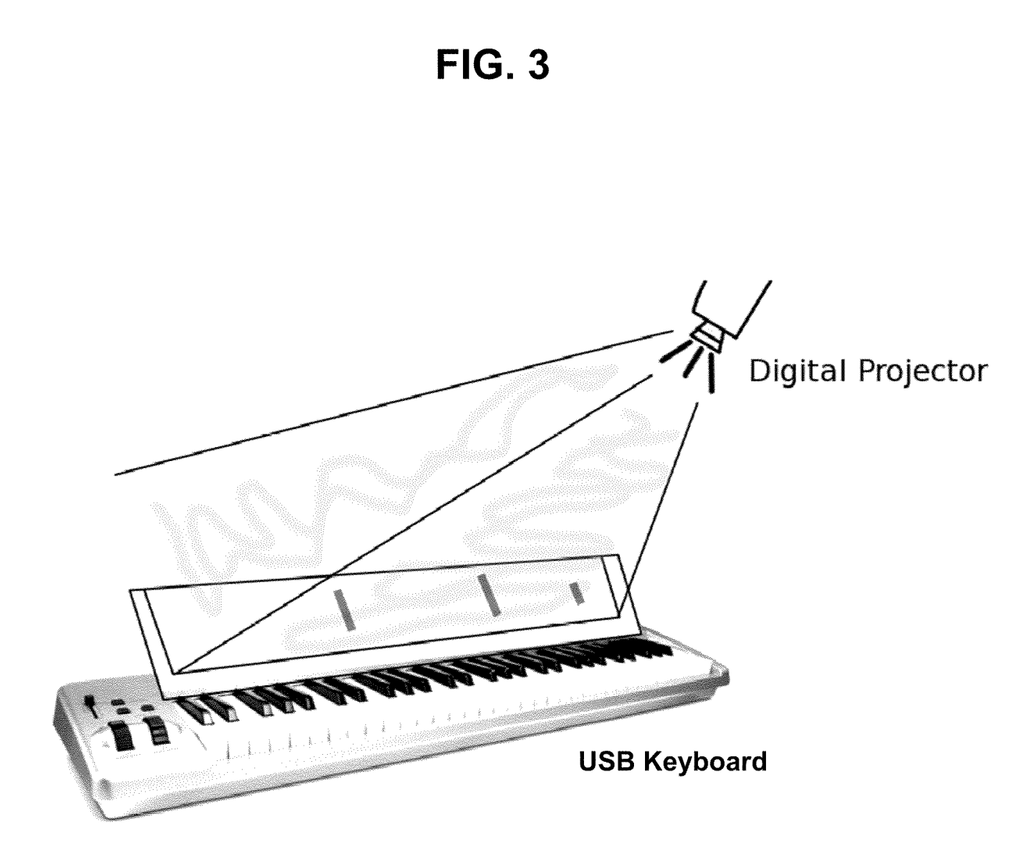
FIG. 3 shows a diagram of an embodiment of the projected game display component of the present invention.
Figure 4:
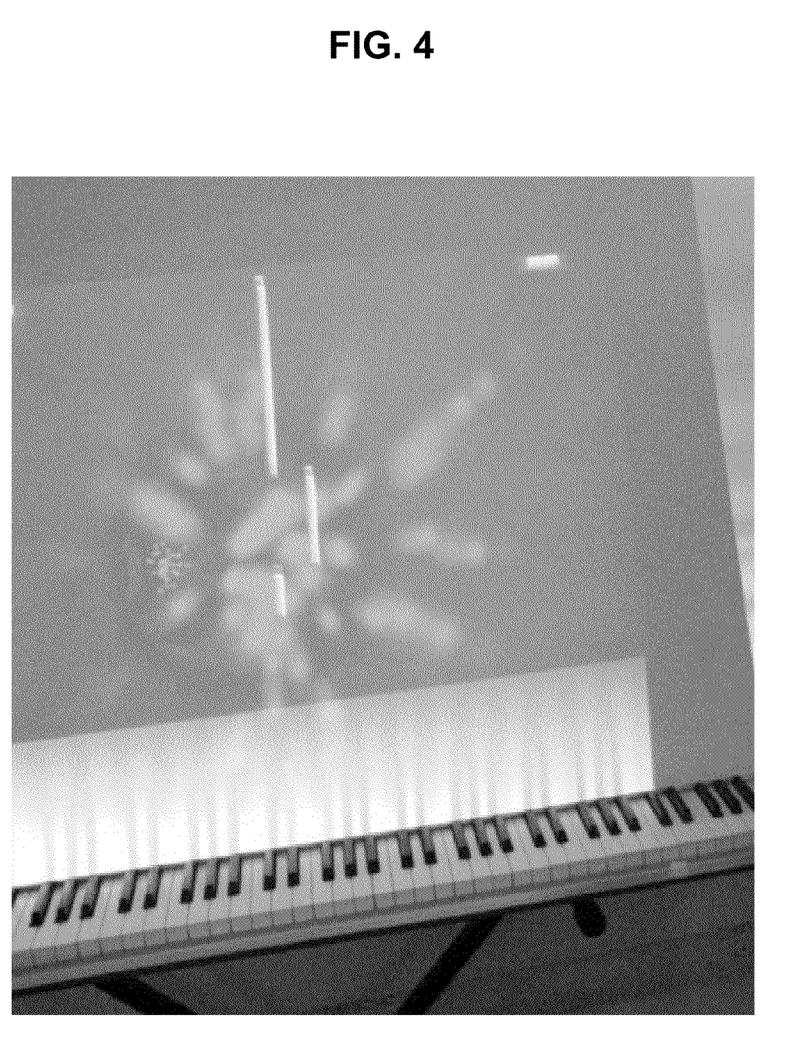
FIG. 4 shows a photograph of a working prototype.

An embodiment of the invention as shown in FIGS. 1, 3, and 4 contains the following elements as described herein. It should be understood that this is an exemplary embodiment and that the invention is not limited to the specific features of this embodiment.

To ensure that skill acquired in the game is transferable to a real keyboard, a standard-range 88-key keyboard was used as the input device, and the mapping of keys to notes in game play was the standard mapping. The player may use any USB-compatible keyboard she or he may already own, thereby reducing cost relative to games that require specialized controllers.

A large display is placed close to or flush against the keyboard, such that a scrolling sequence of game elements can be lined up precisely with the corresponding physical keys on the keyboard. This eliminates the step of mentally mapping keys from an onscreen keyboard representation to the physical keys, allowing the novice user to respond more quickly. In preferred embodiments, the aligned display includes an essentially fixed portion that indicates the alignment of the field of play with the keys of the keyboard. See, e.g., FIG. 4, which shows a lighted rectangle in the bottom third of the image, the lighted rectangle having vertical shadowy elements that clearly align with the black keys of the keyboard instrument. In some embodiments, the screen is at right angles to the keyboard, but in some embodiments, the display may be at an angle or may be horizontal (i.e., may be essentially co-planar with the keyboard).

The display is not limited to any particular style of display. For example, as diagrammed in FIG. 3, the display may be a board or screen onto which the game images are projected, e.g. from behind and/or above a game player. However, the display is not limited to projection from the rear, and other display systems, such as rear projection (projection from behind a translucent display surface), or appropriately sized electronic displays that do not involve a separate projector (e.g., CRT, LCD or plasma displays) are also contemplated for use with the invention.

One aspect of the configuration comprising projection from behind the player (as in FIG. 3) is that projector should be positioned such that the player's shadow does not fall on portions of the display surface in use during game play. Because projection from behind the player generally requires the projector to be pointed at the screen at an oblique angle (i.e., at an angle other than at a right angle to the surface of the display), an additional aspect of this configuration is a step of calibrating the projected image so as to correct distortion caused by the oblique projection, and to align the game elements with the proper keys on the physical keyboard.

Game Play

During game play, the user is presented with visual cues or game elements to indicate the sequence of upcoming notes. The user may also be presented with cues as to which range of keys will be used for the current segment of the song and as to where she should position her hands for optimal play. Elements of the graphical display may be optimized to fit particular song context. For example, if a particular chord reappeared frequently in a song, all appearances of that chord may be color-coded so that the player could spot and play that chord more efficiently. Other elements of the graphical display may be adjusted according to, for example, the nature of the song or the level of the player (e.g., color, brightness, presence or absence of visual elements indicative of mood and/or rhythm).

In preferred embodiments, game elements appear on the display surface in alignment with a key to which they correspond, and the motion of the game element in the game element window remains aligned with the key. For example, in preferred embodiments, the game element appears above the corresponding key and proceed toward the key (e.g., "dropping" down if above the keys, or moving toward the keys if the keyboard and display are co-planar).

Song files are generally derived from MIDI files (e.g., publically available, original, licensed, etc.), and the MIDI files which the sequence of raw notes for the song. A user may also install his or her own MIDI files, such that the user may provide a custom library of songs for the game. Some MIDI files may be annotated with any additional information required to provide special visual cues described above. In some cases, MIDI files may be supplemented with recorded tracks, such as may be extracted from an MP3 music file, e.g., to make the in-game songs sound more like original popular recordings, and/or to include additional audio elements such as other instruments, vocals, etc.

A networkable computer may be used to provide multiplayer play over networks, and/or to allow players to play together on songs with multiple instrument parts. Such multiplayer configuration may be used with some or all players together (e.g., in a single room) or with one or more players playing from a remote location.

Software design comprises one or more modules, selected from the group that includes but is not limited to:
1. A song file parser, to read MIDI note data, pre-recorded sound data, and any additional metadata or annotations added to song files;
2. A keyboard input handler, to gather information about key depressions (including timing) and to abstract away differences in keyboard hardware;
3. A game logic module, to determine the state of the game given the keyboard input and the song being played;
4. An onscreen interface, to visually display the game state and other user interface elements;
5. An audio feedback module, to play back the music (or discord) generated by the player and the backup tracks;
6. A display calibration module, to ensure that the onscreen interface aligns with the physical keyboard, abstracting away differences in display hardware; and
7. A network game module, to facilitate multiplayer games with other copies of the software over a network.

An exemplary flow of information between modules is illustrated in FIG. 1.

To minimize costs for the user, in this embodiment, the software product is agnostic as to the computing platform, the display device, and the input device, enabling implementation with a variety of hardware devices, i.e., it can be run on any operating system, with any standard devices.

EXAMPLE

An embodiment of the game system of the invention was configured using an M-Audio Keystation 61-key USB as the input device. For a display device, a 24-inch flat-panel Dell LCD was used in some prototypes, and a computer video projector in other prototypes. The former had an advantage of requiring minimal calibration, while the latter had the advantage that the image could span the entire width of the keyboard, and could be projected onto a keyboard-proximal display surface so as to align exactly with the keys. The projector also allowed display of images on the keys themselves, which provides additional possibilities for enhancing the user interface and/or the game play experience.

In order to facilitate readable code and rapid prototyping, software was written in Python. Writing in an interpreted language ensured cross-platform compatibility. Performance cost was not found to be an issue in working prototypes. Python modules used included PyOpenGL for graphics and PyPortMidi to receive input from the keyboard.

The success of the development of embodiments of the present invention largely hinged on a creating a fun and intuitive user experience. Experience-enhancing features include a keyboard-aligned game display and visual cues for hand placement. One skilled in the art will appreciate that interdependencies between the product's components in certain embodiments may necessitate specification change over time; for example, user interface features that require displaying images directly on the keyboard are only feasible in embodiments supporting properly functioning projector calibration procedures.

One skilled in the art will appreciate that the instant invention may be modified to accommodate group play involving more than one user. In some embodiments, additional users may play non-keyboard game instruments, including but not limited to drums, guitar, bass guitar, and vocals (microphone).

Although the input device described in associated with the examples discussed here is a piano keyboard MIDI instrument, it is contemplated that the sounds associated or assigned to particular key positions for game play need not be traditional piano sounds, or sounds associated with a traditional keyboard-based instrument (e.g., organ, harpsichord, etc.), nor even sounds associated with a melodic instrument. Embodiments of the invention comprise using a keyboard or other controller aligned with a display surface, wherein keys of the keyboard are used to produce any standard MIDI assignable sound, including but not limited to percussive sounds, and non-musical sound effects (e.g., bird tweet, telephone ring, helicopter, applause, gunshot.) The array of sounds assignable according to MIDI standards are well known in the art.

The game experience, including the experience of both the user, and of onlookers watching and enjoying the game play, may be further enhanced by additional visual cues such as lights, colors, patterns, or other graphic displays. In one non-limiting example, such displays may pulse, become larger or smaller, become brighter or dimmer, change shape, or otherwise change in appearance in a manner correlating with an aspect of musical game play such as rhythm, volume, or pitch. In some embodiments, such displays may correlate with the accuracy of user performance. In other embodiments, game-enhancing cues are audio in nature.

One skilled in the art will also appreciate that embodiments of the present invention may further incorporate a graphical and/or audio display correlated to an audience, whether the audience is non-representative (for example, solely computer-generated) or representative (for example, of actual online participants). Such graphical or audio displays of audience "participation" may consist of, for example, applause, cheering, dancing, and the like.

We claim:

1. A system for entertainment or instruction involving a keyboard musical instrument comprising:
   i) a computing unit;
   ii) a keyboard musical instrument having a plurality of instrument keys forming a piano keyboard, in communication with said computing unit;
   iii) a keyboard-proximal display surface juxtaposed with said instrument keys of said piano keyboard;
   iv) an audio display unit in communication with said computing unit; and
   v) a projector unit in communication with said computing unit and enabling presentation by said computing unit of a scrolling sequence of incoming graphical game elements on a field of play on said keyboard-proximal display surface, wherein said graphical game elements are music making cues that move in said field of play from a starting point toward said keys of said piano keyboard and that provide advance notice to a player of a position of a key on said piano keyboard to be operated and a time at which the key should be operated;
   wherein said computing unit comprises a display calibration module configured to correct distortion from oblique projection from said projector unit to said keyboard-proximal display surface and to align said graphical game elements on said keyboard-proximal display surface with said instrument keys of said piano keyboard, and
   wherein said computing unit is configured to receive information about key operation of said keyboard musical instrument and to detect play accuracy.

2. The system of claim 1, wherein said computing unit is configured to provide rewards in relation to play accuracy.

3. The system of claim 1, wherein said keyboard-proximal display surface is a passive display not in communication with said computing unit.

4. The system of claim 1, wherein said system comprises one or more of a keyboard input handler module and a game logic module.

5. A method of entertainment or instruction for a user of a keyboard musical instrument comprising:
   i) using or providing a system comprising:
   a) a computing unit,
   b) a keyboard musical instrument having a plurality of instrument keys forming a piano keyboard, in communication with said computing unit;
   c) a keyboard proximal display surface juxtaposed with said instrument keys of said piano keyboard;
   d) an audio display unit in communication with said computing unit; and
   e) a projector unit in communication with said computing unit and enabling presentation by said computing unit of a scrolling sequence of incoming graphical game elements on a field of play on said keyboard-proximal display surface, wherein said graphical game elements are music making cues that move in said field of play from a starting point toward said keys of said piano keyboard and that provide advance notice to a player of a position of a key on said piano keyboard to be operated and a time at which the key should be operated,
   wherein said computing unit comprises a display calibration module configured to correct distortion from oblique projection from said projector unit to said keyboard-proximal display surface and to align said graphical game elements on said keyboard-proximal display surface with said instrument keys of said piano keyboard,
   ii) projecting a scrolling sequence of graphical game elements on said keyboard-proximal display surface;
   iii) detecting user key operation; and
   iv) determining play accuracy of said user.

6. The method of claim 5, wherein said using or providing comprises performing a display calibration step.

7. The method of claim 6, wherein said display calibration step results in substantial alignment of a width of at least one game element with a width of at least one of said plurality of instrument keys.

8. The method of claim 5, wherein said system provides note elements correlated with at least one of said game elements.

9. The method of claim 8, wherein said note elements are generated in accordance with music files.

10. The method of claim 9, wherein said music files are MIDI files.

11. The method of claim 5, wherein said detecting user key operation comprises sensing a property of user key contacting, said property selected from the group consisting of position, pitch, timing, and duration.

12. The method of claim 11, further comprising detection of intensity of key strike.

13. The method of claim 5, wherein said detecting user key operation involves use of a keyboard input handler module.

14. The method of claim 8, wherein said determining play accuracy comprises comparing said user key operation to pitch, rhythm and/or duration specified by at least one of said note elements and/or said game elements.

15. The method of claim 5, wherein said determining play accuracy comprises evaluation of key strike strength in relation to audio note volume.

16. The method of claim 5, wherein said determining play accuracy comprises use of a game logic module.

17. The method of claim 5, further comprising a reward presentation step when play accuracy exceeds a predetermined level.

* * * * *